US010889524B2

(12) United States Patent
Tanaka

(10) Patent No.: US 10,889,524 B2
(45) Date of Patent: Jan. 12, 2021

(54) METHODS OF PRODUCING CERAMIC MOLDED PRODUCT AND TRANSPARENT SINTERED BODY

(71) Applicant: SHIN-ETSU CHEMICAL CO., LTD., Tokyo (JP)

(72) Inventor: Keita Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 286 days.

(21) Appl. No.: 15/411,084

(22) Filed: Jan. 20, 2017

(65) Prior Publication Data

US 2017/0210672 A1 Jul. 27, 2017

(30) Foreign Application Priority Data

Jan. 27, 2016 (JP) ................. 2016-013462

(51) Int. Cl.
| | | |
|---|---|---|
| C04B 35/505 | (2006.01) | |
| C04B 35/50 | (2006.01) | |
| C04B 35/64 | (2006.01) | |
| C04B 35/63 | (2006.01) | |
| C04B 35/634 | (2006.01) | |
| C04B 35/638 | (2006.01) | |
| G02B 1/02 | (2006.01) | |
| C04B 35/624 | (2006.01) | |
| C04B 35/626 | (2006.01) | |
| C04B 35/645 | (2006.01) | |
| B28B 3/02 | (2006.01) | |

(52) U.S. Cl.
CPC ............ *C04B 35/505* (2013.01); *C04B 35/50* (2013.01); *C04B 35/624* (2013.01); *C04B 35/6261* (2013.01); *C04B 35/6303* (2013.01); *C04B 35/638* (2013.01); *C04B 35/63488* (2013.01); *C04B 35/64* (2013.01); *C04B 35/6455* (2013.01); *G02B 1/02* (2013.01); *B28B 3/02* (2013.01); *C04B 2235/3224* (2013.01); *C04B 2235/3225* (2013.01); *C04B 2235/3227* (2013.01); *C04B 2235/3244* (2013.01); *C04B 2235/48* (2013.01); *C04B 2235/5427* (2013.01); *C04B 2235/5445* (2013.01); *C04B 2235/5454* (2013.01); *C04B 2235/602* (2013.01); *C04B 2235/604* (2013.01); *C04B 2235/608* (2013.01); *C04B 2235/656* (2013.01); *C04B 2235/658* (2013.01); *C04B 2235/6562* (2013.01); *C04B 2235/6567* (2013.01); *C04B 2235/661* (2013.01); *C04B 2235/666* (2013.01); *C04B 2235/667* (2013.01); *C04B 2235/668* (2013.01); *C04B 2235/77* (2013.01); *C04B 2235/81* (2013.01); *C04B 2235/9646* (2013.01); *C04B 2235/9653* (2013.01)

(58) Field of Classification Search
CPC ....... C04B 35/505; C04B 35/50; C04B 35/64; C04B 35/6303; C04B 35/63488; C04B 35/638; C04B 35/624; C04B 35/6261; C04B 35/6455; G02B 1/02
See application file for complete search history.

(56) References Cited

U.S. PATENT DOCUMENTS

| | | | | |
|---|---|---|---|---|
| 3,640,887 A | * | 2/1972 | Anderson | ............... C04B 35/50 252/301.4 F |
| 5,854,156 A | | 12/1998 | Honda et al. | |
| 2003/0091491 A1 | | 5/2003 | Magne | |
| 2011/0160036 A1 | * | 6/2011 | Gries | .................... C04B 35/486 501/134 |
| 2012/0328879 A1 | * | 12/2012 | Nahas | ................... C04B 35/486 428/402 |
| 2014/0094357 A1 | | 4/2014 | Ikari et al. | |
| 2015/0273433 A1 | | 10/2015 | Nakatsuru et al. | |
| 2015/0353913 A1 | * | 12/2015 | Greene | .................. A61K 38/51 424/94.5 |

FOREIGN PATENT DOCUMENTS

| | | |
|---|---|---|
| CN | 101610990 A | 12/2009 |
| EP | 0 381 524 A2 | 8/1990 |
| EP | 1 336 596 A1 | 8/2003 |
| EP | 1 775 273 A1 | 4/2007 |
| JP | 6-211573 | 8/1994 |
| JP | 2000-203940 A | 7/2000 |
| JP | 2003-89578 A | 3/2003 |
| JP | 2004-505875 A | 2/2004 |
| JP | 2005-104818 A | 4/2005 |
| JP | 2006-282436 A | 10/2006 |
| JP | 2007-254186 A | 10/2007 |
| JP | 2014-088309 A | 5/2014 |
| JP | 2014-97922 A | 5/2014 |
| JP | 2014-129234 A | 7/2014 |
| JP | 5652309 B2 | 11/2014 |

(Continued)

OTHER PUBLICATIONS

Communication with European Search Report, EP Application No. 17153310.2, dated Jul. 20, 2017, 8 pages.

(Continued)

*Primary Examiner* — Mathieu D Vargot
(74) *Attorney, Agent, or Firm* — Myers Bigel, P.A.

(57) ABSTRACT

A transparent sintered body having fewer air bubble-derived defects is provided. More specifically, a method is provided of producing a ceramic molded product including at least a step of pressure-molding ceramic granules having a Hausner ratio, which is a quotient obtained by dividing a tapped bulk density by a loose bulk density, of 1.0 or more but not more than 1.2. Also provided is a method of producing a transparent sintered body including at least each of the steps of the above method to obtain a ceramic molded product and a step of heating and sintering the resulting ceramic molded product. The transparent sintered body has a linear transmittance of 78% or more at a wavelength of 600 nm to 2000 nm inclusive except for an element-derived characteristic absorption wavelength.

5 Claims, No Drawings

(56) References Cited

FOREIGN PATENT DOCUMENTS

| JP | 2015-212209 A | 11/2015 |
|----|---------------|---------|
| WO | WO 2005/122654 A1 | 12/2005 |
| WO | 2008071659 A1 | 6/2008 |
| WO | WO 2014/054731 A1 | 4/2014 |
| WO | 2015066662 A1 | 5/2015 |

OTHER PUBLICATIONS

Office Action with English language translation, JP Application No. 2016-013462, dated Sep. 27, 2018, 6 pp.
"Office Action", CN Application No. 201710060098.3, dated Nov. 3, 2020, 8 pp.

* cited by examiner

METHODS OF PRODUCING CERAMIC MOLDED PRODUCT AND TRANSPARENT SINTERED BODY

RELATED APPLICATION

This application claims priority from Japanese Patent Application No. 2016-013462, filed Jan. 27, 2016, the disclosure of which is incorporated by reference herein in its entirety.

FIELD AND BACKGROUND OF THE INVENTION

The present invention relates to a transparent sintered body that is capable of transmitting visible light or infrared radiation, or both, and to a method of production therefor.

A variety of ceramics ranging from conventional tiles and pottery to fine ceramics such as piezoelectric elements, superconducting elements, and transparent ceramic bodies have been produced. They are indispensable for modern life.

As a method of producing ceramics, a pressure molding method in which pressure is applied to a mold filled with granules obtained by granulating a raw material powder has conventionally been employed. The pressure molding method includes a uniaxial pressing method in which a load is applied, in a vertical or horizontal direction, to a mold filled with granules, a cold isostatic pressure molding method (CIP) in which a hydraulic pressure is applied to a rubber mold filled with granules to isotropically apply a load thereto, and combination thereof.

When a uniaxial pressing method is used, it is common practice to granulate a raw material powder by using a spray-drying apparatus or the like. Air bubbles occurring inside the molded product after press molding inevitably remain even after sintering and become a cause of deteriorating, for example, the strength of ceramics. Air bubbles generated inside the molded product are desirably as few and as small as possible. Air bubbles occurring during pressing can be minimized, for example, by granulating the raw material powder by spray drying or the like to improve the filling property of powders into the mold and the pressure transmission property in the mold during molding.

For example, it has been reported that granules having a good filling property can be obtained by improving a spray-drying apparatus to suppress generation of fine powders to the minimum level during preparation of granules (Japanese Patent No. 5652309B).

In addition, it has been reported that by specifying a water content in granules and adjusting their electrostatic capacitance to from 0.06 to 0.6 nC/g and thereby suppressing static electricity generated when the granules flow, granules thus obtained have good flow characteristics; and by grounding a contact portion between a press molding jig and granules, the number of granules adhering to the jig decreases, and molding properties are improved (Japanese Patent Application Publication No. 2006-282436A).

A Hausner ratio is a parameter indicating the filling property of powders. The Hausner ratio is represented by a quotient obtained by dividing "tapped bulk density" of powders filled into a certain container as much as possible by predetermined tapping (vertical vibration) or the like by "loose bulk density" of powders filled into the container loosely. The filling property of powders can be known from this value. The Hausner ratio is used for evaluation of, for example, the filling property of a water absorbing material or the flow characteristics of phosphorus pentaoxide powders (WO2014/054731 and Published Japanese Translation of PCT Application No. 2004-505875).

Transparent ceramics were discovered in the 1960s, and their development has been accelerated by the success in laser oscillation using YAG ceramics in the 1990s. Examples of the application of the transparent ceramics include a Faraday rotator using TGG ceramics, a phosphor using YAG:CE, and a scintillator material such as of GOS ceramics. These transparent ceramics are required to have physical properties such as having no visible optical defects and having sufficient light transmission properties.

Ceramics are produced by sintering powders, so they usually contain many light scattering factors. Examples of the light scattering factors mainly include pores, different phases, and impurity segregation at grain boundaries.

One type of optical defect in transparent ceramics is an air bubble defect. It can be classified roughly into defects due to micrometer-size air bubbles of not more than 1 μm present at the grain boundary or in the grain, and defects due to larger air bubbles of 5 μm or more generated by uneven molding during pressure molding. In the former case, a transparent ceramic molded product has the micrometer-size air bubbles throughout the molded product so that there is an overall deterioration in transmittance. On the other hand, in the latter defects, that is, defects due to larger air bubbles present locally inside the transparent ceramic molded product, the transmittance is deteriorated only at the location where they are present. For example, transparent ceramics used for magneto-optical elements or optical lenses are required to have fewer air bubbles also throughout the transparent ceramic molded product and to have a high transmittance. There is a demand for reducing the occurrence of both types of air bubble defects.

With regard to the former micrometer-size air bubble defects, it has been reported that micrometer-size air bubble defects can be markedly reduced by using, as a raw material powder, particles of an oxide of a rare earth element having, in the particle size distribution thereof, a particle size (D2.5 value) at which the cumulation from the minimum side is 2.5%, is 180 nm or more, but not more than 2000 nm (Japanese Laid-Open Patent Publication No. 2014-88309). When the particle diameter (D2.5 value) is less than 180 nm, micrometer-size air bubbles sometimes remain because the grain growth rate exceeds the discharge rate of air bubbles during sintering. Powders having particle diameter (D2.5 value) more than 2000 nm, on the other hand, are not suitable because pores between particles generated during molding are too coarse (Japanese Laid-Open Patent Publication No. 2014-88309).

SUMMARY OF THE INVENTION

Japanese Laid-Open Patent Publication No. 2014-88309 is only a report example of micrometer-size air bubble defects of about 1 μm and does not refer to coarse air bubble defects that can be macroscopically observed. It was impossible to suppress generation of coarse air bubble defects even by the operation as described in Japanese Laid-Open Patent Publication No. 2014-88309.

Even though the filling property of powders is known to be important, powders having a desired filling property are selected not by using, for example, a rational expression representing a Hausner ratio as a parameter of the filling property, but based on empirical findings (Japanese Patent No. 5652309 and Japanese Laid-Open Patent Publication No. 2006-282436). In conventional ceramic production, characteristics of powders used as a raw material can be known for the first time after molding and sintering granulated powders into a final product. It takes much time to know the results and trial production that has proved to be useless increases. They lead to a problem also from the standpoint of cost. In products such as transparent ceramics, in which optical quality is deteriorated by coarse air bubble defects, useless trial production or a defective fraction increases without being anticipated, and to some extent, characteristics that may lead to defects are in the stage of raw material powders. In other words, anticipating, to some extent, an air bubble amount in the ceramics from the raw material powders before molding enables production of high-quality transparent ceramics with high efficiency. Such a criterion has not yet been provided.

The present invention was made in view of the above circumstances. An object is to provide ceramic granules suited for producing a transparent ceramic molded product (transparent sintered body) having an improved optical quality by introducing a Hausner ratio which indicates filling characteristics of a powder as a parameter for controlling air bubbles generated inside the transparent ceramic molded product and studying an optical quality of the transparent ceramic molded product in relation to the Hausner ratio.

In one embodiment of the invention, there is provided a method of producing a ceramic molded product including at least a step of pressure-molding ceramic granules having a Hausner ratio, that is, a quotient obtained by dividing a tapped bulk density by a loose bulk density, of more than 1.0 but not more than 1.2.

In another embodiment of the invention, there is provided a method of producing a transparent sintered body including at least each of the steps of the above-described production method for obtaining a ceramic molded product and a step of heating and sintering the resulting ceramic molded product. The transparent sintered body thus obtained transmits wavelengths of 600 nm or more but not more than 2000 nm and at the same time, has a linear transmittance of 78% or more at a wavelength other than a characteristic absorption wavelength derived from an element.

The invention makes it possible to produce a ceramic molded product with fewer defects due to air bubbles by controlling a Hausner ratio, which is a parameter indicating the flow characteristics of powders, so ceramic granules fall within a predetermined range during production of a transparent ceramic molded product. A transparent sintered body can be obtained by heating and sintering the resulting ceramic molded product under predetermined conditions.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

Embodiments of the present invention will hereinafter be described. It is however noted that the invention is not limited by the embodiments described below. One embodiment of the invention provides a method of producing a ceramic molded product which includes at least a step of pressure-molding ceramic granules having a Hausner ratio, that is, a quotient obtained by dividing a tapped bulk density by a loose bulk density, of more than 1.0 but not more than 1.2.

Starting Raw Material of Ceramic Molded Product

In the invention, a starting raw material of a ceramic molded product (which may hereinafter be called "ceramic raw material") is not particularly limited insofar as it is a material which is capable of providing a sintered product having desired transparency. The starting raw material of a ceramic molded product is preferably, for example, a compound represented by the following compositional formula: $RE_2O_3$ (wherein RE is at least one rare earth element selected from the group consisting of Sc, Y, La, Gd, Tb, Dy, Ho, Er, Tm, Yb, and Lu). The compound preferably has a cubic crystal structure and does not have a second phase. Alternatively, a ceramic raw material may be obtained by synthesizing using, for example, oxide particles of at least one rare earth element selected from the group consisting of scandium oxide particles, yttrium oxide particles, and a lanthanide element either alone or in combination. The ceramic raw material is preferably a spherical or plate-shaped material having a primary particle diameter of 50 nm or more but not more than 1000 nm.

Although no particular limitation is imposed on the method of preparing the starting raw material of a ceramic molded product, any synthesizing method, for example, co-precipitation, pulverization, spray pyrolysis, sol-gel, and alkoxide hydrolysis may be used. In order to obtain a ceramic raw material having a desired particle diameter, the starting raw material may be processed as needed using a wet ball mill, bead mill, jet mill, dry jet mill, or hammer mill. For example, a starting raw material may be obtained using a mixing method in which uniformity is produced by sintering a mixture of a plurality of kinds of oxide particles by a solid-phase reaction, followed by atomic diffusion, or a coprecipitation method in which uniformity is produced by precipitating a hydroxide or a carbonate from an ion-containing solution having oxide particles dissolved therein and burning it into a corresponding oxide. It is particularly preferred to obtain powders by mixing oxide particles, a solvent, and an additive such as dispersant to obtain a mixed material in slurry form, and then removing the solvent from the resulting slurry.

Mixed Material

For molding ceramic granules, first, the above-described ceramic raw material is mixed with, for example, an organic additive or sintering aid to prepare a mixed material.

Examples of the organic additive include a dispersant such as nonionic surfactant or anionic surfactant, a binder such as polyvinyl alcohol or polyacrylic acid, a plasticizer such as polyethylene glycol or glycerin, and a lubricant such as stearic acid. For example, one or more of these organic additives as suitable may be added as needed. In some cases, none of them may be added. When the organic additive is added, it is added desirably in an amount so as to provide a ceramic molded product having desired physical properties.

The amount is preferably 5 mass % or less, more preferably 2 mass % or less in total, based on the amount of the ceramic raw material.

The sintering aid is added to control the growth of particles during sintering. Examples of the sintering aid include $ZrO_2$ and $Al_2O_3$. It is preferred to add $ZrO_2$ as a sintering suppressant when the growth rate of particles during sintering is high and to add $Al_2O_3$ as a sintering accelerator when the growth rate is low. The kind and amount of the sintering aid is desirably adjusted as needed because the effect of it differs depending on the ceramic raw material used.

Examples of the method of mixing the ceramic raw material with, for example, the organic additive or sintering aid include mixing with shear force in a uniaxial ball mill, a planetary ball mill, a bead mill, a jet mill, a mortar, or a homogenizer, and mixing under ultrasonic irradiation. No particular limitation is imposed as long as the mixture can be converted into a slurry. From the standpoint of productivity and handling ease, a ball mill and a bead mill are particularly preferred.

Ceramic Granules

Next, ceramic granules are prepared by granulating the resulting mixed material in slurry form. By adjusting with a solvent such as ethanol or pure water, the mixed material in slurry form preferably has a ceramic raw material content of from 20 to 40 mass % (ceramic concentration) in the mixed material. Examples of the method of removing the solvent from the slurry to obtain granules include a spray dry method. Granules of a desired size may be obtained not by the spray drying method but, for example, by a method of removing the solvent by a vibration dryer and then sieving the residue into a predetermined size by using a breaking granulator. When ceramic granules have a wide granule size distribution, they can be classified into those having only an intended granule diameter.

The ceramic granules preferably have a Hausner ratio more than 1.0 but not more than 1.2. The Hausner ratio is one of the indicators of a flow characteristic related to filling of powders and has been used for evaluating the filling property of a water absorbing material or the flow characteristics of phosphorus pentaoxide powder in fields other than ceramics (Patent Documents 3 and 4). The Hausner ratio is indicated by a quotient obtained by dividing "tapped bulk density", that is, a bulk density when a certain container is filled with powder as much as possible while undergoing predetermined tapping or the like (vibration in a vertical direction or horizontal and back and forth directions) by "loose bulk density", that is, a bulk density when the container is loosely filled with powders. The filling property of the powders can be known by this value. The Hausner ratio can be represented by the following equation:

Hausner ratio="tapped bulk density"÷"loose bulk density"

The relationship between Hausner ratio and flow characteristics is shown in Table 1. The Hausner ratio shows the degree of the flow characteristics of granules and granules having a Hausner ratio more than 1.0 but not more than 1.2 are judged that they have good flow characteristics. When a molding jig or rubber is filled with granules having good flow characteristics, an initial filling ratio is high because each single granule is dry and not sticky. Pressure molding under a high initial filling ratio decreases a volume change of air bubbles because molding can be performed so as to crush small air bubbles in a space between the granules. On the other hand, when a Hausner ratio is more than 1.2, granules have a poor flow character. During filling a mold or the like with the granules, a phenomenon such as bridging occurs due to interaction between the granules, and coarse air bubbles appear, and this results in a low initial filling ratio. Pressure molding under a low initial filling ratio increases a volume change of air bubbles, because molding is performed so as to crush the bridging. As a result, there is a high probability of air bubbles remaining.

TABLE 1

| Flow Characteristic | Hausner Ratio |
| --- | --- |
| Excellent | 1.00-1.11 |
| Good | 1.12-1.18 |
| Fair | 1.19-1.25 |
| Satisfactory | 1.26-1.34 |
| Poor | 1.35-1.45 |
| Very Poor | 1.46-1.59 |
| Very, Very Poor | >1.60 |

The loose bulk density is particularly preferably 15% or more but not more than 20% based on the true density of ceramic granules. The loose bulk density is a value obtained by subtracting, from the true density of the whole ceramic granules, the true density of a portion replaced by air bubbles between granules, air bubbles between a granule and a wall of a mold, and air bubbles in the granule. When the granules used have the same size, the loose bulk density varies depending on air bubbles in the granule. When a relative value of the loose bulk density to the true density is less than 15%, granules are molded inevitably while having many air bubbles therein so that air bubbles are likely to remain inside the molded product. When a relative value of the loose bulk density to the true density exceeds 20%, air bubbles between granules cannot be crushed easily during pressing because air bubbles inside the granules are too few and the granules become too hard. In the invention, the loose bulk density, tapped bulk density, and true density may be measured in accordance with, for example, JIS R 1628:1997 "Test methods for bulk density of fine ceramic powder". The loose bulk density (g/mL) can be determined by pouring a predetermined amount of granules in a measuring cylinder having a diameter of 10 mm so as to make the surface as flat as possible, reading the highest scale of the granules with which the measuring cylinder has been filled, and dividing the mass (g) of the used granules by the volume (mL) of the granules thus read. The tapped bulk density (g/mL) can be determined by pouring granules in a measuring cylinder so as to make the surface as flat as possible as in the determination of the loose bulk density, applying vibrations 100 times in a vertical, horizontal or back-forth direction by tapping with a rubber hose from the outside of the measuring cylinder or by making use of an oscillator, reading the highest scale of the granules with which the measuring cylinder has been filled while confirming that application of vibrations does not cause a volume change, and dividing the mass (g) of the used granules used by the volume of the granules thus read. Examples of the evaluation method of the true density include a method of measuring a crystal lattice constant by X-ray diffraction and calculating the density of a unit lattice as a true density; and a method of measuring the density of a transparent sintered body by the Archimedes method or the like and regarding this value as a true density. In the invention, it is preferred to measure a loose bulk density and a tapped bulk density of ceramic particles before the pressure molding step, described later. When ceramic granules have been proved not to have a predetermined Hausner ratio as a result of measurement, a loose bulk density and a tapped bulk density of the ceramic granules may be measured again after granulation treatment through tumbling fluidization or fluidized bed treatment. Ceramic granules having a desired Hausner ratio may also be prepared by the above-described treatment.

The ceramic granules preferably have an average diameter of 100 μm or more, but not more than 1000 μm. Even granules having an average diameter of more than 1000 μm may have a Hausner ratio of not more than 1.2, and thus, have good flow characteristics, but a pore present inside the granules sometimes is too large. This sometimes makes it difficult to completely crush the pores in the granules, for example, even when the granules are molded by a dry press. On the other hand, granules having an average diameter less than 100 μm sometimes have poor flow characteristics because they are likely to have a Hausner ratio exceeding 1.2 and are too light in weight and in addition, interaction occurs between charged granules. The average diameter of the granules can be determined by observation using a laser diffraction particle size distribution analyzer (dry) or a microscope, or by calculation based on a weight distribution by sieve classification.

Molding

Next, a ceramic molded product is formed by pressure-molding the ceramic granules. The molding method is not particularly limited as long as it can yield a molded product having a predetermined shape. Examples include a uniaxial pressing method. The resulting molded product may be subjected to CIP treatment after uniaxial pressing into a higher-density molded product. The pressure during pressure molding is not particularly limited, but it is preferably from 100 to 300 MPa.

Debindering

Next, the ceramic molded product may be heated as needed to remove therefrom the organic additive in a debindered molded product. In the production of a ceramic molded product, it is common practice to carry out decomposition of an organic additive such as binder at a temperature less than 1000° C. for hours, so-called debindering, so that the binder or the like does not remain in the final product. For example, the ceramic molded product is placed in a heating furnace in an air atmosphere and heated at a temperature at which an organic matter such as organic additives can be burnt and decomposed, for example, preferably at 250° C. or more, more preferably at 400° C. or more. It is only necessary to raise the temperature slowly enough not to cause cracks or fracture which will otherwise occur due to carbon dioxide generated by thermal decomposition of the organic additive.

Sintering

Next, the debindered molded product may be heated and thereby sintered into a transparent sintered body. Examples of the heating method in sintering include electric furnace heating and induction heating with microwaves. Examples of the atmosphere in sintering include air, oxygen, nitrogen, helium, and vacuum. The atmosphere is selected depending on what molded product is desired. A sintering profile such as holding temperature after heating, heating time, and temperature elevation rate is desirably adjusted as needed so as to provide a ceramic molded product having intended transparency. For example, the holding temperature after heating is preferably from 1300 to 1800° C., more preferably from 1400 to 1700° C. The heating time is preferably from 1 to 20 hours. The relative density of the ceramic sintered body after sintering, that is, the density after sintering relative to the true density is preferably 95% or more, but not more than 100%. The density increased by sintering is preferably as high as possible.

After sintering, the ceramic molded product thus sintered may be subjected to HIP treatment to have more improved transparency. The medium of a pressure gas to be used for HIP treatment is preferably Ar or nitrogen. The pressure of the gas is preferably 50 MPa or more but not more than 300 MPa. When the pressure is less than 50 MPa, the sintered body cannot always have sufficient transparency. Pressure greater than 300 MPa becomes a burden on the apparatus and may damage it. The setting temperature for HIP treatment or sintering time is desirably adjusted as needed so as to achieve desired transparency.

The transparent sintered body thus obtained is a compound represented by the following compositional formula: $RE_2O_3$ (wherein RE is at least one rare earth element selected from the group consisting of Sc, Y, La, Gd, Tb, Dy, Ho, Er, Tm, Yb, and Lu). It preferably has a cubic crystal structure and does not contain a second phase. The transparent sintered body may have a cubic crystal system bixbyite structure.

The transparent sintered body has light transmission properties in a visible or infrared range. The transparent sintered body has a wavelength of 600 nm or more but not more than 2000 nm, preferably 600 nm or more but not more than 1350 nm and at the same time, has a linear transmittance of 78% or more at a wavelength except for the element-derived characteristic absorption wavelength. The term "element-derived characteristic absorption wavelength" as used herein is a wavelength which is assigned to f-f transitions of each element based on the Dieke diagram and at which optical absorption occurs. The following is a transparent region of each element at the wavelength of from 600 to 2000 nm: Y is transparent over a wavelength range of from 600 to 2000 nm, Sc from 600 to 2000 nm, La from 600 to 2000 nm, Gd from 600 to 2000 nm, Dy from 600 to 700 nm, Ho from 700 to 730 nm, from 800 to 850 nm, from 950 to 1050 nm, from 1300 to 1500 nm, and from 1750 to 2000 nm, Er from 900 to 1450 nm and from 1700 to 2000 nm, Tm from 600 to 650 nm, from 850 to 1030 nm, from 1350 to 1600 nm, and from 1800 to 2000 nm, Yb from 600 to 800 nm and from 1150 to 2000 nm, and Lu from 600 to 2000 nm. The linear transmittance is an index indicating how light incident vertically thereto, for example, a flat plate sample made of a transparent sintered body is attenuated in the flat plate sample. In short, it means a ratio of an amount of a transmitted light having a direction equal to that of the incident light relative to an amount of the incident light. In the invention, a transparent sintered body having desired transparency can be obtained by using granules having a Hausner ratio greater than 1.0 but not more than 1.2. The linear transmittance can be evaluated by measuring a laser output before and after transmission of a laser light through the transparent sintered body. For example, the linear transmittance can be indicated by $I/I_0 \times 100(\%)$ wherein $I_0$ represents the intensity of a laser light evaluated without using the transparent sintered body and I represents the intensity of a laser light after transmission through the transparent sintered body. In addition, the number of air bubbles macroscopically observed in the transparent sintered body is small. For example, it is desired that the air bubbles have a diameter of 100 μm or less and their frequency is 200 pieces/$cm^3$ or less. The air bubbles can be observed under a microscope. They may be found, for example, by using a 10× objective lens and shifting the focus position from the upper portion to the lower portion of the transparent sintered body within a range of 1000×1000 $\mu m^2$. The measurement position of the air bubbles is not particularly limited. They may be measured, for example, at the center of the transparent sintered body and eight positions therearound. The measurement range of air bubbles may be within a range of 3000×3000 μm².

The transparent sintered body can be used for solid laser medium, X-ray or gamma-ray scintillator material, magneto-optical device material, light emitting tube, fluorescence medium, high-refractive-index optical member, fluorescent substance, optical lens, magneto-optical element, or the like. The transparent sintered body is particularly preferably used for fluorescent substance, optical lens, or magneto-optical element. The transparent sintered body used for these optical applications are preferably polished at both end surfaces thereof. The optical surface precision at the time of optical polishing is preferably V8 or less, particularly preferably λ/10 or less. It is also possible to reduce an optical loss further by forming an anti-reflective film on the optically polished surface.

EXAMPLES

The present invention will next be described in further detail with reference to Examples and Comparative Examples. It should not be construed that the present invention is limited to or by Examples.

Some transparent sintered bodies having a bixbyite structure and using $RE_2O_3$ (wherein RE is at least one rare earth element selected from the group consisting of Sc, Y, La, Gd, Tb, Dy, Ho, Er, Tm, Yb, and Lu) are shown below.

Example 1

Yttrium oxide powder ($Y_2O_3$, product of Shin-Etsu Chemical) (50 g), 0.50 g of $ZrO_2$ serving as a sintering aid, a predetermined amount, that is, 117 g of ethanol, zirconia ball (product of Nikkato, average diameter: 2 mm) as a grinding medium, 0.05 g of a polyethylene alkyl ether-based dispersant as an organic additive, and 1.0 g of a polyvinyl alcohol-based binder were poured in a pot made of a resin and they were mixed using a ball mill method to obtain a slurry. The ceramic concentration and the binder concentration each in the mixed material slurry are about 30 mass % and 2 mass %, respectively. The ball mill treatment time is 20 hours. The mixed material slurry thus obtained was granulated using a spray dry system and the resulting granules were subjected to sieve classification into predetermined size.

The resulting granules were subjected to uniaxial pressing with a mold, followed by CIP molding to obtain a columnar molded product having a diameter of 7 mm and a height of 16 mm.

The molded product thus obtained was debindered by heating at 500° C. for 20 hours under an air atmosphere. The debindered molded product was sintered by heating at 1500° C. for 2 hours under vacuum. The sintered molded product was heated at 1500° C. for 3 hours for HIP treatment to obtain a transparent sintered body. The transparent sintered body thus obtained was optically polished into a piece having a diameter of 5 mm and a thickness of 10 mm by using a centerless rounding processor and polishing/lapping flat-plate polishing machine.

Size Selection of Granules Used for Production of Molded Product

For the formation of a ceramic molded product, granules having a predetermined average diameter obtained by sieve classification were used. In Example 1, granules which had passed a sieve of 180 μm and remained on a 150-μm sieve were used to adjust the average diameter of the granules to 165 μm.

Method of Measuring Hausner Ratio of Granules

The Hausner ratio is a ratio of tapped bulk density to a loose bulk density. It was measured using 10 g of granules selected as described above and a measuring cylinder having a diameter of 10 mm. The loose bulk density was calculated by pouring the granules in the measuring cylinder along the mouth thereof using a spatula or drug wrapping paper while turning the cylinder, thereby making the surface of the granules as flat as possible; reading the maximum scale at which the granules had been filled; and dividing an amount (g) of the poured granules by a volume (mL) of the granules measured using the measuring cylinder. On the other hand, the tapped bulk density was measured by pouring granules, similar to the measurement of the loose bulk density, into a measuring cylinder so as to make the surface of the granules as flat as possible; confirming that no volume change occurred even after applying vibration to it 100 times in the back and forth and right and left directions by tapping the outside of the measuring cylinder with a rubber hose; reading the maximum scale of the measuring cylinder at which the granules had been filled; and dividing an amount (g) of the poured granules by a volume (mL) of the granules measured by the measuring cylinder. These operations are performed three times for each of the loose bulk density and the tapped bulk density and the Hausner ratio is calculated using the average of them. In addition, a value obtained by measuring the density of the transparent sintered body by the Archimedes method was used as a true density of the ceramic granules. The average of the loose bulk density was divided by the true density to obtain a relative value (%) of the loose bulk density to the true density. Similarly, a relative value (%) of the tapped bulk density to the true density was calculated. Table 2 shows respective relative values (%) of the loose bulk density and the tapped bulk density to the true density and a Hausner ratio.

Examples 2 to 17

Examples 2 to 4 were performed in a manner similar to that of Example 1 except that granules having an average diameter as shown in Table 2 were selected. Examples 5 to 13 were performed in a manner similar to Example 1 except that the compounds shown in Table 2 were used instead of the yttrium oxide powder and granules having an average diameter as shown in Table 2 were selected. The compounds used are each a product of Shin-Etsu Chemical. Examples 14 and 15 were performed in a manner similar to Example 1, except that $Tb_2O_3$ (product of Shin-Etsu Chemical) and $Y_2O_3$ were added at a mole ratio of 6:4 and granules having an average diameter as shown in Table 2 were selected. Example 16 was performed in a manner similar to Example 1 except that 3.0 g (binder concentration: 6 mass %) of a polyvinyl alcohol-based binder was added and granules having an average diameter as shown in Table 2 were selected. Example 17 was performed in a manner similar to Example 1 except that mixing was performed not using a ball mill method but a magnetic stirrer to obtain a flocculated slurry and granules having an average diameter as shown in Table 2 were selected. Physical properties of the granules obtained in Examples 2 to 17 are shown in Table 2.

Comparative Examples 1 to 4

Comparative Examples 1 to 3 were performed in a manner similar to Example 1 except that 1.1 g, 3.6 g, and 6.2 g of yttrium oxide powders ($Y_2O_3$, product of Shin-Etsu Chemical) were used to give a ceramic concentration of 1, 3, and 5 mass % in the mixed material, respectively, and granules having an average particle as shown in Table 3 were selected. Comparative Example 4 was performed in a manner similar to Example 1, except that a polyvinyl alcohol-based binder was not added and granules having an average diameter as shown in Table 3 were selected. Physical properties of the granules obtained in Comparative Example 1 to 4 are shown in Table 3.

485 nm or more. In those Examples, the linear transmittance was measured within a wavelength range from 600 to 1350 nm and at the same time, within a wavelength range other than an element-derived characteristic absorption wavelength. The linear transmittance was measured at several points in the plane of the transparent sintered body. Table 4 shows the wavelength used for measurement and the maximum and minimum values of the linear transmittance at that wavelength.

TABLE 2

| | | True density of composition ($g/cm^3$) | Size of opening of sieve Maximum/μm | Size of opening of sieve Minimum/μm | Average diameter of granules/μm | Physical properties of granules Loose bulk density Measured/ g mL$^{-1}$ | Physical properties of granules Loose bulk density Relative value to true density/(%) | Physical properties of granules Tapped bulk density Measured/ g mL$^{-1}$ | Physical properties of granules Tapped bulk density Relative value to true density/(%) | Hausner ratio |
|---|---|---|---|---|---|---|---|---|---|---|
| Ex. 1 | $Y_2O_3$ | 5.01 | 180 | 150 | 165 | 0.862 | 17.2 | 1.01 | 20.2 | 1.17 |
| Ex. 2 | $Y_2O_3$ | 5.01 | 200 | 100 | 150 | 0.912 | 18.2 | 0.991 | 19.8 | 1.09 |
| Ex. 3 | $Y_2O_3$ | 5.01 | 425 | 200 | 360 | 0.882 | 17.6 | 1.01 | 20.2 | 1.15 |
| Ex. 4 | $Y_2O_3$ | 5.01 | 500 | 425 | 460 | 0.892 | 17.8 | 1.00 | 20.0 | 1.12 |
| Ex. 5 | $Sc_2O_3$ | 3.86 | 250 | 150 | 200 | 0.618 | 16.0 | 0.656 | 17.0 | 1.06 |
| Ex. 6 | $La_2O_3$ | 6.51 | 300 | 200 | 250 | 1.11 | 17.1 | 1.32 | 20.3 | 1.19 |
| Ex. 7 | $Gd_2O_3$ | 7.40 | 200 | 180 | 190 | 1.21 | 16.3 | 1.32 | 17.8 | 1.09 |
| Ex. 8 | $Dy_2O_3$ | 7.80 | 500 | 355 | 430 | 1.35 | 17.3 | 1.46 | 18.7 | 1.08 |
| Ex. 9 | $Ho_2O_3$ | 8.41 | 300 | 200 | 250 | 1.26 | 15.0 | 1.42 | 16.9 | 1.13 |
| Ex. 10 | $Er_2O_3$ | 8.64 | 300 | 212 | 260 | 1.37 | 15.9 | 1.49 | 17.3 | 1.08 |
| Ex. 11 | $Tm_2O_3$ | 8.60 | 200 | 160 | 180 | 1.39 | 16.2 | 1.48 | 17.2 | 1.06 |
| Ex. 12 | $Yb_2O_3$ | 9.17 | 355 | 250 | 310 | 1.48 | 16.1 | 1.59 | 17.3 | 1.07 |
| Ex. 13 | $Lu_2O_3$ | 9.42 | 200 | 100 | 150 | 1.57 | 16.7 | 1.70 | 18.0 | 1.08 |
| Ex. 14 | $(Tb_{0.6}Y_{0.4})_2O_3$ | 6.73 | 300 | 212 | 260 | 1.18 | 17.5 | 1.38 | 20.5 | 1.17 |
| Ex. 15 | $(Tb_{0.6}Lu_{0.4})_2O_3$ | 8.36 | 250 | 160 | 190 | 1.44 | 17.2 | 1.67 | 20.0 | 1.16 |
| Ex. 16 | $Y_2O_3$ | 5.01 | 425 | 300 | 360 | 1.20 | 24.0 | 1.32 | 26.3 | 1.10 |
| Ex. 17 | $Y_2O_3$ | 5.01 | 200 | 160 | 180 | 0.651 | 13.0 | 0.762 | 15.2 | 1.17 |

TABLE 3

| | Composition | True density of composition ($g/cm^3$) | Size of opening of sieve Maximum/μm | Size of opening of sieve Minimum/μm | Average Diameter of granules/μm | Loose bulk density Measured/ g mL$^{-1}$ | Loose bulk density Relative value to true density/(%) | Tapped bulk density Measured/ g mL$^{-1}$ | Tapped bulk density Relative value to true density/(%) | Hausner ratio |
|---|---|---|---|---|---|---|---|---|---|---|
| Comp. Ex. 1 | $Y_2O_3$ | 5.01 | 75 | 26 | 50 | 0.661 | 13.2 | 1.09 | 21.8 | 1.65 |
| Comp. Ex. 2 | $Y_2O_3$ | 5.01 | 100 | 53 | 75 | 0.691 | 13.8 | 1.11 | 22.2 | 1.61 |
| Comp. Ex. 3 | $Y_2O_3$ | 5.01 | 26 | — | 20 | 0.521 | 10.4 | 1.14 | 22.8 | 2.19 |
| Comp. Ex. 4 | $Y_2O_3$ | 5.01 | 300 | 200 | 250 | 0.892 | 17.8 | 1.34 | 26.7 | 1.51 |

Measurement of Linear Transmittance of Transparent Sintered Body

The linear transmittance of the transparent sintered body thus obtained was measured using an ultraviolet-visible-near infrared absorption spectrum measurement apparatus. Rare earth oxides have a characteristic absorption wavelength, depending on their elements, so that the linear transmittance is determined at a wavelength other than the characteristic absorption wavelength. For example, Tb has a characteristic absorption assigned to f-f transitions in the vicinity of 485 nm, but it does not cause light absorption at a wavelength of Observation of Air Bubbles Inside Transparent Sintered Body Air bubbles inside a 3 mm×3 mm region of the transparent sintered body thus obtained were observed using a polarizing microscope. The air bubbles were classified into two groups: having a size (diameter) of 100 μm or more and having a size (diameter) less than 100 μm. The frequency of air bubbles not less than 0.5 piece/mm$^3$ was expressed as "many". The results are shown in Table 4.

TABLE 4

| | Linear transmittance | | | The frequency of air bubbles piece/mm³ | |
|---|---|---|---|---|---|
| | Minimium/ % | Maximum/ % | Wavelength/ nm | 100 μm or more | Less than 100 μm |
| Ex. 1 | 80.6 | 81.2 | 1060 | 0 | 0.20 |
| Ex. 2 | 81.2 | 81.5 | 1060 | 0 | 0.02 |
| Ex. 3 | 80.8 | 81.3 | 1060 | 0 | 0.07 |
| Ex. 4 | 80.6 | 81.2 | 1060 | 0 | 0.04 |
| Ex. 5 | 79.9 | 80.1 | 1060 | 0 | 0.10 |
| Ex. 6 | 81.8 | 82.1 | 1060 | 0 | 0.04 |
| Ex. 7 | 81.4 | 81.5 | 1060 | 0 | 0.02 |
| Ex. 8 | 80.0 | 80.2 | 700 | 0 | 0.06 |
| Ex. 9 | 80.6 | 80.8 | 1030 | 0 | 0.09 |
| Ex. 10 | 80.7 | 81.0 | 1060 | 0 | 0.08 |
| Ex. 11 | 80.8 | 81.1 | 950 | 0 | 0.04 |
| Ex. 12 | 80.0 | 80.4 | 750 | 0 | 0.10 |
| Ex. 13 | 81.0 | 81.4 | 1060 | 0 | 0.06 |
| Ex. 14 | 81.3 | 81.5 | 1060 | 0 | 0.03 |
| Ex. 15 | 80.6 | 81.2 | 1060 | 0 | 0.09 |
| Ex. 16 | 77.4 | 81.3 | 1060 | 0 | Many |
| Ex. 17 | 76.2 | 81.1 | 1060 | 0 | Many |
| Comp. Ex. 1 | 73.1 | 81.1 | 1060 | 0.2 | Many |
| Comp. Ex. 2 | 72.4 | 81.5 | 1060 | 0.09 | Many |
| Comp. Ex. 3 | 65.6 | 80.4 | 1060 | Many | Many |
| Comp. Ex. 4 | 69.4 | 80.6 | 1060 | Many | Many |

The above results show that in the bixbyite structure, a transparent sintered body containing granules having a Hausner ratio of 1.2 or more and therefore having poor flow characteristics was found to have therein many optical defects and have a transmittance less than 78%. Even if the granules had a Hausner ratio of 1.2 or less, an extremely low or high loose bulk density increased more or less the number of defects due to air bubbles, and it leads to partial deterioration in transmittance. For the synthesis of a ceramic molded product that provides a transparent sintered body having a good optical quality, it is necessary and sufficient to suppress the Hausner ratio to 1.2 or less and the loose bulk density relative to the true density of the material is preferably adjusted to from 15 to 20%.

As the above results show, irrespective of the composition of the ceramic molded product, the transparent sintered body having a diameter of 5 mm and a thickness of 10 mm produced by using granules having a Hausner ratio of 1.2 or less and therefore having good flow characteristics has no visible air bubble defects having a diameter of 100 μm or more and further, has air bubble defects having a diameter of 100 μm or less at a frequency reduced to 0.5 piece/mm³ or less. Thus, it has a high transmittance and therefore can be used as an optical material such as lens or magneto-optical element.

The present invention has so far been described based on some embodiments. The invention is, however, not limited to or by these embodiments and can be provided in other embodiments or modified by addition, alteration, elimination, or the like within a range conceivable by those skilled in the art. Any embodiment is embraced within the scope of the invention as long as it produces an effect and advantage of the present invention.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A method of producing a ceramic molded product, comprising the steps:
    preparing a mixed material in slurry form by mixing spherical or plate-shaped powders having a primary particle diameter of 50 nm to 1000 nm of a ceramic raw material with an organic additive or sintering aid;
    granulating the mixed material in slurry form to form ceramic granules having a Hausner ratio, which is a quotient obtained by dividing a tapped bulk density by a loose bulk density, of more than 1.0 but not more than 1.2, wherein the ceramic granules have an average diameter of 100 to 1000 μm, and wherein a relative value of the loose bulk density to a true density of the ceramic granules is 15% or more but not more than 20%; and
    pressure-molding the ceramic granules.

2. The method of producing a ceramic molded product according to claim 1, further comprising a step, before the pressure molding step, of measuring the loose bulk density and the tapped bulk density of the ceramic granules.

3. A method of producing a transparent sintered body, comprising at least:
    each of the steps of the method as claimed in claim 1 to obtain a ceramic molded product; and
    a step of heating and sintering the ceramic molded product to obtain a transparent sintered body,
    wherein the transparent sintered body has a linear transmittance of 78% or more at a wavelength range of from 600 nm to 2000 nm inclusive except for an element-derived characteristic absorption wavelength.

4. The method of producing a transparent sintered body according to claim 3, wherein the transparent sintered body has a cubic crystal structure represented by the following compositional formula: $RE_2O_3$ (wherein RE is at least one rare earth element selected from the group consisting of Sc, Y, La, Gd, Tb, Dy, Ho, Er, Tm, Yb, and Lu) and does not contain a second phase.

5. The method of producing a transparent sintered body according to claim 3, wherein the sintered body is used for a fluorescent substance, optical lens, or magneto-optical element.

* * * * *